(12) United States Patent
Earl et al.

(10) Patent No.: US 6,996,284 B2
(45) Date of Patent: Feb. 7, 2006

(54) SYSTEM AND METHOD FOR FLATTENING SPANS

(75) Inventors: David J. Earl, Cambridge (GB); Mark Jones, Cambridge (GB); John Jefferies, Cheshire (GB)

(73) Assignee: Global Graphics Software Limited, Cambridge (GB)

( * ) Notice: Subject to any disclaimer, the term of this patent is extended or adjusted under 35 U.S.C. 154(b) by 338 days.

(21) Appl. No.: 10/378,543

(22) Filed: Mar. 3, 2003

(65) Prior Publication Data

US 2004/0120593 A1 Jun. 24, 2004

Related U.S. Application Data

(60) Provisional application No. 60/362,947, filed on Mar. 8, 2002.

(51) Int. Cl.
*G06K 9/36* (2006.01)
*G06K 9/46* (2006.01)

(52) U.S. Cl. .................................................... 382/245
(58) Field of Classification Search ............... 382/245; 341/59; 358/426.13
See application file for complete search history.

(56) References Cited

U.S. PATENT DOCUMENTS

| | | | |
|---|---|---|---|
| 5,075,779 A | 12/1991 | Lefebvre et al. | |
| 5,295,235 A | 3/1994 | Newman | |
| 5,377,023 A | 12/1994 | Sano et al. | |
| 5,497,434 A * | 3/1996 | Wilson | ............... 382/245 |
| 5,727,090 A | 3/1998 | Yellin | |
| 6,721,456 B1 * | 4/2004 | Aschenbrenner et al. | ... 382/245 |

* cited by examiner

*Primary Examiner*—Phuoc Tran
(74) *Attorney, Agent, or Firm*—Darby & Darby PC

(57) ABSTRACT

A system and method for computing a run-length encoded raster in which spans are successively added to a raster or overlapping spans are flattened. Spans are temporarily expanded into a pixel array representing part of the raster, where entries in the pixel array are references to color values and other property data. Successive spans modify the pixel array. References in the array are then compared to run-length encode the partial raster. Remaining parts of the raster are processed similarly. In one embodiment, the array contains pointers referencing color and property information. In another embodiment, the array contains small indexes referencing a color palette.

29 Claims, 8 Drawing Sheets

FIG. 2.1
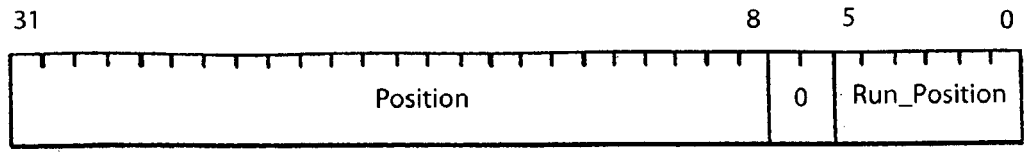
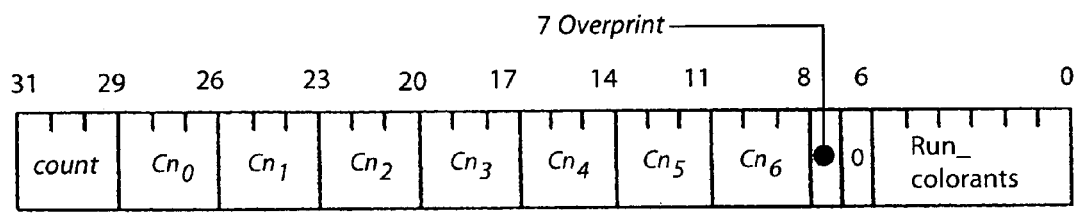
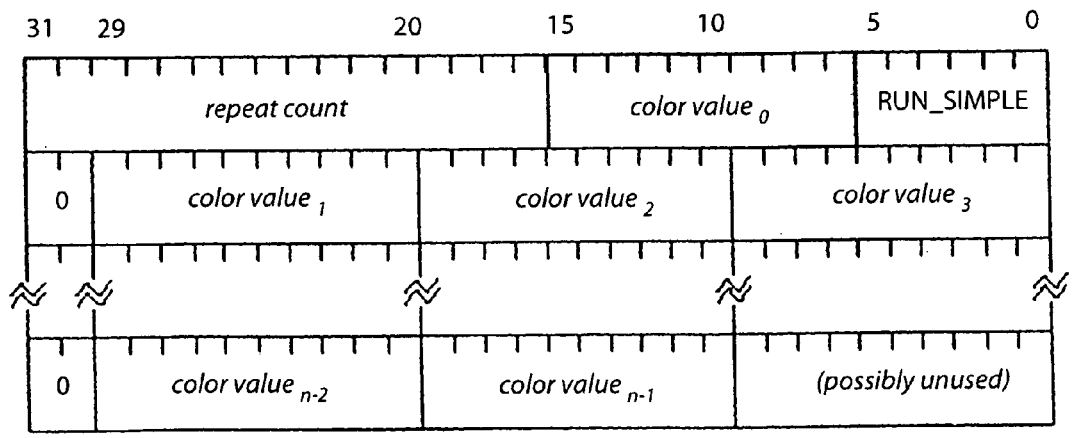

FIG. 2.2
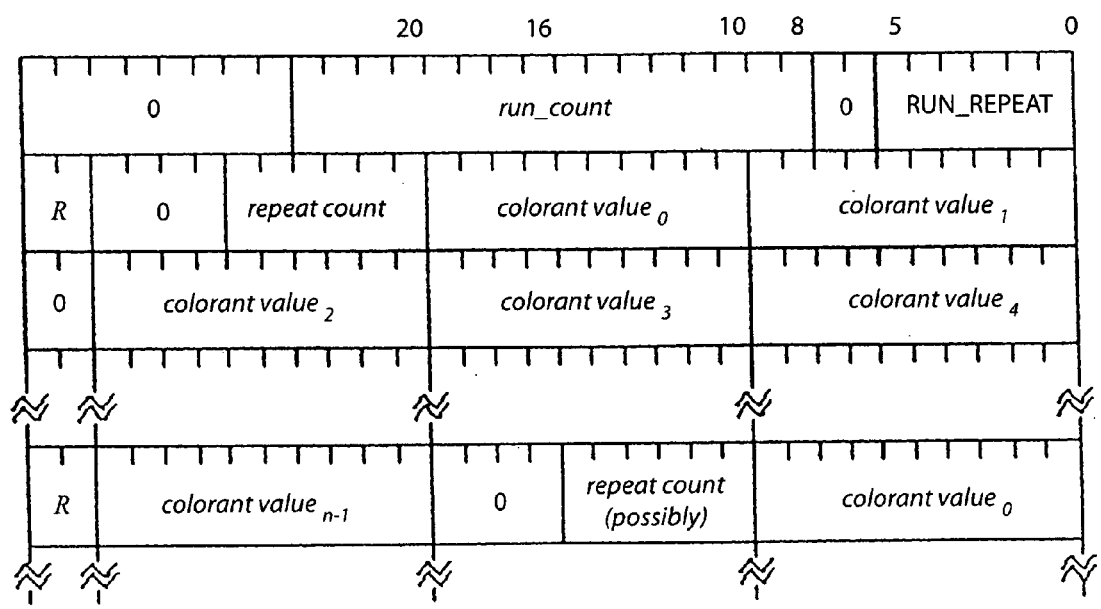
(d) Repeat
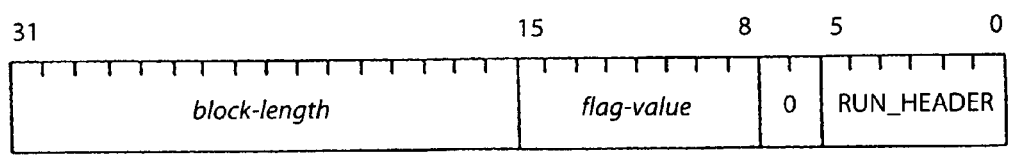
(e) Header

SYSTEM AND METHOD FOR FLATTENING SPANS

RELATED APPLICATIONS

The present invention relates to, and claims priority of, U.S. Provisional Patent Application Ser. No. 60/362,947 filed on Mar. 8, 2002, having the same title as the present invention, the entirety of which is incorporated herein by reference.

BACKGROUND OF THE INVENTION

1. Field of the Invention

The invention generally relates to the field of computer graphics and, more particularly, to a system and method for generating run-length encoded raster data from spans.

2. Description of the Related Art

A raster is a computer representation of the colored pixels or dots of a picture or page, which may or may not be printed on some physical medium or displayed on a computer screen. A Page Description Language (PDL) is a means of describing a page or pages in terms of shapes and colors, rather than pixels. It is the job of a raster image processor to convert a page description expressed in a PDL into a raster.

Rasters may be stored in many different formats, such as:

(a) 'pixel interleaved', where the values for each colorant of a pixel are included in the raster before any of the values for colorants of subsequent pixels;

(b) 'line interleaved', where all the values for the colorants of one scanline of raster data are included before any of the colorants of the next scanline of raster data. Here, the values for each colorant of the line are grouped together;

(c) 'band interleaved', where color values for a single colorant of several consecutive lines are grouped together; and (d) 'frame interleaved', where all the color values for each colorant of every pixel on the page appear before any values of the subsequent colorants.

It is also possible to store single colorants in separate files or separate areas of computer memory, i.e., in 'separations' that are sometimes used in printing.

Rasters may be compressed. This is sometimes achieved by treating the raster as a stream of bytes without using the knowledge that the content is a raster. Here, signal processing techniques are applied to the data independently of the representation.

Often, however, techniques that use knowledge about the nature of the raster data are employed. This saves space while still making it relatively easy to process the data. One such well-known technique is 'run-length encoding'. Here, instead of expressing the color of each pixel individually, a common characteristic of rasters is exploited: that consecutive pixels often have the same color. Each line of a raster is comprised of a series of 'runs', where each run represents a sequence of pixels of the same color.

A 'span' is a run that is encoded as a color and a count of the number of Contiguous pixels sharing the color. Sometimes, a span may also contain a start position or pixel offset from the edge of the raster. This permits the omission of background spans, at the cost of the extra memory to store the position information. The inclusion of a position pixel or offset also permits representation of overlapping spans. Second and subsequent spans that overlap a first span would obliterate or mix with the shared pixels according to the painting model (discussed below). To utilize such a raster for display or printing requires the unique determination of the color of each pixel, and this requires the replacement of overlapping spans with non-overlapping spans. This process is known as 'flattening'.

In addition to color information about an area of a raster, a span may also contain property information, such as the kind of halftone screening required, transparency information, trapping properties (particularly, which trapping zone the span falls in), and 'hot spot' information that identifies an area which, when selected by a user, would cause some desired action to occur.

Prior to addition of a new graphic shape to a raster (whether run-length encoded or not), it is decomposed into spans by a process known as 'scan conversion'. The merging of these spans with a run-length encoded raster is substantially the same as flattening overlapping spans. Indeed, collecting overlapping spans from all shapes and then flattening them at the end is a useful technique in some situations.

Run-length encoding is applicable in either pixel interleaved form where the runs represent contiguous identical pixels, or line, band, frame, or separation interleaved where runs of similar values for individual colorants are separately encoded and boundaries of runs for the different colorants are not required to coincide.

An example of a run-length encoded format is the LW (Linework) and HC (High Resolution Continuous Tone) sub-parts of the TIFF/IT-P1 standard (ISO 12639:1998(E)).

Many page description languages specify that an opaque painting model will sometimes or always be used. Among these are the PostScript Language (PostScript Language Reference, second edition 1991 and third edition 1999, Addison-Wesley) and PDF (Portable Document Format Reference Manual, version 1.3, 1999 and version 1.4, 2001, Adobe Systems Incorporated), which are incorporated herein by reference.

In an opaque painting model, such as shown in FIG. 1($a$), each shape that is applied by the page description to the page is defined such that anything that is previously painted in the same area of the raster is obliterated.

Other painting models permit the combination of the foreground shape with the background in a variety of ways. In the PostScript Language for example, the setoverprint operator can be used to indicate that only those colorants used to paint the shape will be obliterated in the background and other colorants of the same pixels are left unchanged, as shown in FIG. 1($b$).

More complex painting models permit the foreground and the background to be mixed together in a variety of more general ways. This process is known as 'compositing'.

Where a raster is not run-length encoded, it is sufficient to sequentially paint each span of a shape being applied into each pixel of the target raster. However, where a run-length raster is to be flattened or have new shapes applied to it then it is not straightforward or obvious how the run-length encoded background data should be adjusted efficiently. This is especially difficult when overprinting or generally compositing where a run that is entirely covered by another run cannot simply be removed, but must be split into separate runs of different colors.

U.S. Pat. No. 5,075,779 to Lefebvre et al. discloses a method for editing a run-length encoded raster. This, and other similar methods, can be characterized as 'splicing' new spans into old ones. Firstly, however, Lefebvre et al. only relates to single colorant rasters, and further suggests, line, band, frame, and separation interleaved rasters. Many algorithms for processing color require simultaneous access to all the colors of a pixel. A pixel interleaved (run-length encoded) raster is generally used to achieve such access.

Secondly, the method of Lefebvre et al. fails to disclose the processing of non-opaque painting models.

Thirdly, the method disclosed in Lefebvre et al., as well as others that employ linked structures to indicate the sequence of runs, is complicated and requires a significant amount of searching to locate the runs that are obscured or partially obscured by a newly introduced span.

U.S. Pat. No. 5,295,235 to Newman also discloses a method whereby a linked list is utilized to flatten spans. The method disclosed in Newman requires sorting of spans prior to flattening. When constructing a run-length encoded raster, the sorted list must then be processed from left to right, and a record kept of the spans at each pixel. The spans must be compared to determine which one should take precedence, and which one should terminate a span and start a new one. The spans must also be compared to determine when a span does not cover the pixel currently being considered. This entails a considerable amount of processing at each pixel, especially where numerous objects could contribute to the color of a pixel. This is a potentially expensive operation.

U.S. Pat. No. 5,377,023 to Sano et al. also discloses a method for processing run-length data. However, the starting point for the method disclosed is a run-length encoded raster, and not the spans with which it is constructed or modified.

U.S. Pat. No. 5,727,090 to Yellin is one of numerous patents that disclose variations on the way in which run-length data is represented for most efficient compression. Generally, such patents are not concerned with how the raster is constructed with or modified by overlapping spans; but rather how the run-length data is initially or finally packed.

It is therefore apparent that there is a need for a simpler method for advantageously flattening a run-length encoded raster such that searching, sorting and list manipulating are not required. It is also apparent that there is a need for a method to advantageously minimize the amount of memory required for such an operation.

SUMMARY OF THE INVENTION

The invention is a system and method for generating run-length encoded raster data from spans. In accordance with the invention, a first non-overlapping run-length encoded raster is added to the spans of one or more scan-converted shapes to produce a second run-length encoded raster. Alternatively, a run-length encoded raster having overlapping spans is used to produce a second flattened (non-overlapping) run-length encoded raster.

Runs of the first raster are expanded into memory for individual pixels of part of the raster (i.e., an 'expanded partial raster' is created). That is, the color of each pixel in a run is assigned from the color of the run to thereby replicate the color in all pixels in which it appears. In cases where the background color is represented implicitly, the expanded partial raster is first filled with the background color. Each span of consecutive shapes or successive, overlapping spans that fall in the region of pixels for that part of the raster are then expanded sequentially into the expanded partial raster.

If an overlaying shape or span is opaque, the later colors replace the earlier colors. If an overlaying shape or span is not opaque, then colors from a new span are individually combined with the colors of each different background pixel, in accordance with known painting rules.

After processing all spans that intersect the expanded partial raster, the pixels of each line are then sequentially processed. The color (and, if necessary, the other properties) of successive pixels is compared. If a pixel possesses the same color (and properties) as a preceding pixel, it is accumulated into a new span; otherwise the span being accumulated is complete and a new span is started. The method of the present invention is continued in this manner until all pixels of a line have been processed; at which point the outstanding final span is completed. The method of the invention is then repeated for the remaining portions of the raster.

However, the level of processing efficiency depends upon how the colors of successive pixels are compared. If spans (and therefore the combined resultant spans) may have different numbers of colorants, it is also difficult and much less efficient to manage pixel memory. Furthermore, the pixel memory can be large if there is a large number of colorants or if other properties are stored in each run (and thus each pixel in the expanded raster). It is therefore desirable not to represent every possible colorant or property at every pixel when many spot colors or properties could be involved.

Pixel memory is reserved for part of the raster. However, instead of storing color and other property data in the pixel memory, a reference to the color and property data is stored. In embodiments of the present invention, the reference is a pointer, or an index into a table. The color and property data are therefore stored in separately allocated memory from the expanded raster memory. As a result, the color and property data can be advantageously shared between pixels from the same run, as well as disjoint runs. In embodiments where the run-length spans are organized appropriately, the reference is to the same data as for the span from which the pixels were expanded.

Hence, a common size can be maintained for the pixels of the partial raster even when different numbers of colorants are involved. In this case, only the size of the referenced memory needs to change. Furthermore, the total amount of memory required may be less than the total memory required, for storing color data in every pixel. This is especially true when there is a great level of commonality between pixels, including commonality between pixels of non-adjacent spans. Yet further, comparison of pixels in the final re-encoding is also easy: instead of comparing color values and properties, it is sufficient to compare successive references.

The present inventors have observed that a reference to a single color and property is not required. Rather, the reference can be the head of a list of such color and property data memories. This allows the successive layering of a 'stack' of colors on each pixel. As a result, the overlapping nature of the shapes that arise from the overlapping runs is initially reflected. When a new span is introduced, the lists can be adjusted only for those pixels affected, and the expanded partial raster can reflect not just the final color of each pixel, but all the colors that went into the composition of that pixel. This is especially appropriate where compositing must be performed.

BRIEF DESCRIPTION OF THE DRAWINGS

The foregoing and other advantages and features of the invention will become more apparent from the detailed description of the preferred embodiments of the invention given below with reference to the accompanying drawings in which:

FIG. 2 is an illustration of the selection of data records for representing run-length data in accordance with an exemplary embodiment of the invention;

DETAILED DESCRIPTION OF EXEMPLARY EMBODIMENTS

Figure 1A:
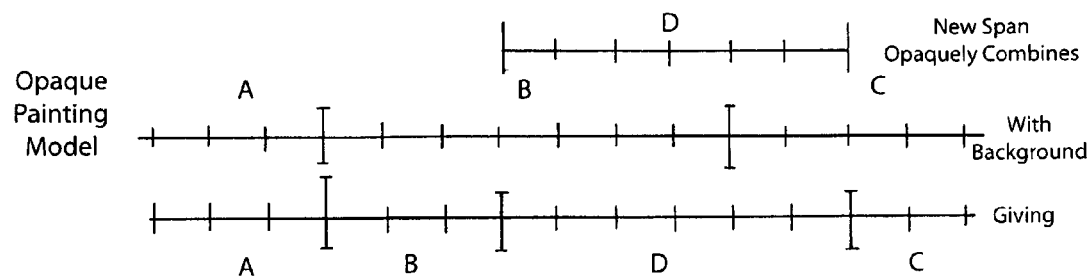
FIG. 1(a) is an exemplary illustration of the flattening of an opaquely painted span in accordance with the prior art.
Figure 1B:
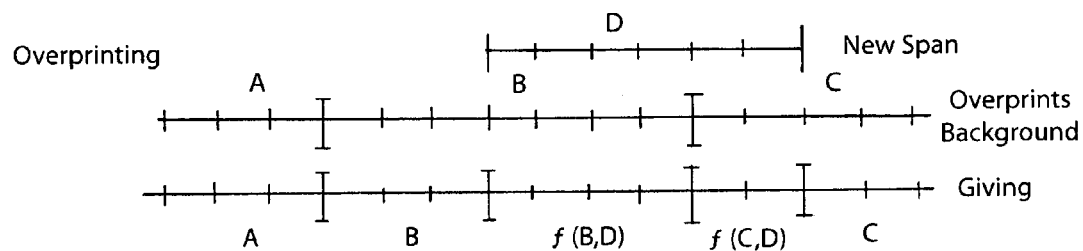
FIG. 1(b) is an alternative illustration of flattening, where a new span overprints or composites with the background in accordance with the prior art.

The system and method of the invention combines conventional decoding and encoding of a run-length encoded raster. Compression and decompression is not performed repeatedly, such as after applying each new span. This is more efficient than splicing linked elements into a data structure representing runs, especially when colors are not opaque.

However, the level of processing efficiency depends upon how the colors of successive pixels are compared. If spans (and therefore the combined resultant spans) may have different numbers of colorants, it is also difficult and much less efficient to manage pixel memory. Furthermore, the pixel memory can be large if there is a large number of colorants or if other properties are stored in each run (and thus each pixel in the expanded raster). It is therefore desirable not to represent every possible colorant or property at every pixel when many spot colors or properties could be involved.

Pixel memory is reserved for part of the raster. However, instead of storing color and other property data in the pixel memory, a reference to the color and property data is stored. In embodiments of the present invention, the reference is a pointer, or an index into a table. The color and property data are therefore stored in separately allocated memory from the expanded raster memory. As a result, the color and property data can be advantageously shared between pixels from the same run, as well as disjoint runs. In embodiments where the run-length spans are organized appropriately, the reference is to the same data as for the span from which the pixels were expanded.

Hence, a common size can be maintained for the pixels of the partial raster even when different numbers of colorants are involved. In this case, only the size of the referenced memory needs to change. Furthermore, the total amount of memory required might be less than the total memory required for storing color data in every pixel. This is especially true when there is a great level of commonality between pixels, including commonality between pixels of non-adjacent spans. Yet further, comparison of pixels in the final re-encoding is also easy: instead of comparing color values and properties, it is sufficient to compare successive references.

The present inventors have observed that a reference to a single color and property is not required. Rather, the reference can be the head of a list of such color and property data memories. This allows the successive layering of a 'stack' of colors on each pixel. As a result, the overlapping nature of the shapes that arise from the overlapping runs is initially reflected. When a new span is introduced, the lists can be adjusted only for those pixels affected, and the expanded partial raster can reflect not just the final color of each pixel, but all the colors that went into the composition of that pixel. This is especially appropriate where compositing must be performed.

In an exemplary embodiment of the present invention, spans and associated information are represented as a series of records. Each record is composed of at least one 32-bit computer word. In accordance with the present embodiment of the invention, the least significant six bits are used to store a code that indicates the "type" of the record. The remainder of the record contains information based on record type. Records are provided which describe each scan line in turn. Within one line, records describe overlapping spans.

Referring now to FIG. 2, record types include:

(a) 'Position' for indicating that the number stored in the most significant 24 bits of the word should reset a 'current position' state in the consumer of the run-length data that represents the offset in pixels from the left side of a scan line where subsequent span data should start.

(b) 'Set colorants' for indicating that subsequent data should contain the number of colorants shown in the record, and that the number of indexes stored in the record identifies those colorants. Where more than seven colorants are simultaneously required or have indexes that are too large to fit in the allocated bits, an alternative record type utilizing more than one word is used.

(c) 'Simple span' for indicating that a span having a length that is established by the illustrated 16 bits of the record and having color values in as many 10-bit portions of the first and successive 32-bit words as are necessary (one field for each colorant in the current set of colorants) should be drawn from a point that commences from the current position. In contemplated embodiments, the current position is advanced by an amount equal to the length of the span.

(d) 'Repeated span' for packing several spans into one record when there are many successive short spans that are contiguous, and for which the set of colorants does not change.

(e) 'Header' for indicating how much record data will be supplied for a scan line such that a consumer can ascertain when a line is complete.

In alternative embodiments, other record types are used to supply property information, and reduce the amount of repeated records.

Figure 3:
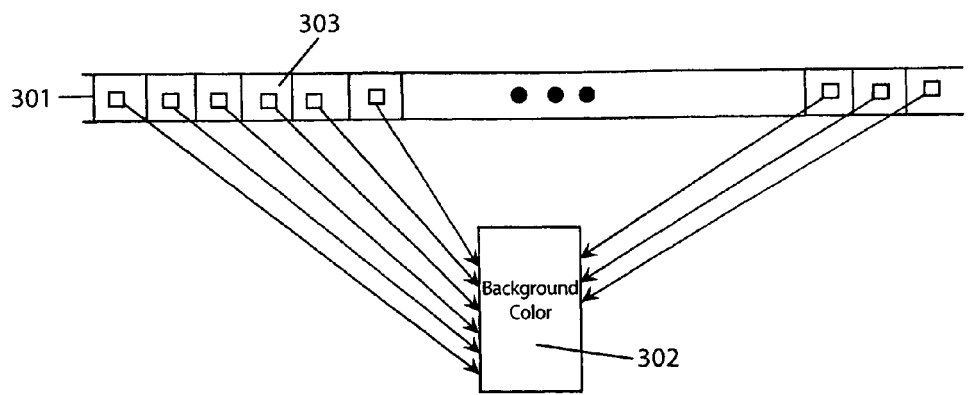
FIG. 3 is an illustration of an arrangement of an array of pixels in accordance with exemplary embodiments of the invention.

FIG. 3 is an illustration of an arrangement of an array of pixels in accordance with exemplary embodiments of the present invention. Here, the pixels store pointers to a background color. An array of pointers 301 is allocated such that the pointers occupy memory contiguously. Each pointer represents one pixel on a scan line. As a result, it is easy to determine and access the memory location of any pixel.

Memory 302 is allocated and populated to represent the background color. A pointer to this memory is assigned to every element of the pixel array (303, and the like). Records are then sequentially processed. When records representing state changes are received, the state changes are implemented. When records representing span data are received the spans are processed.

Figure 4:
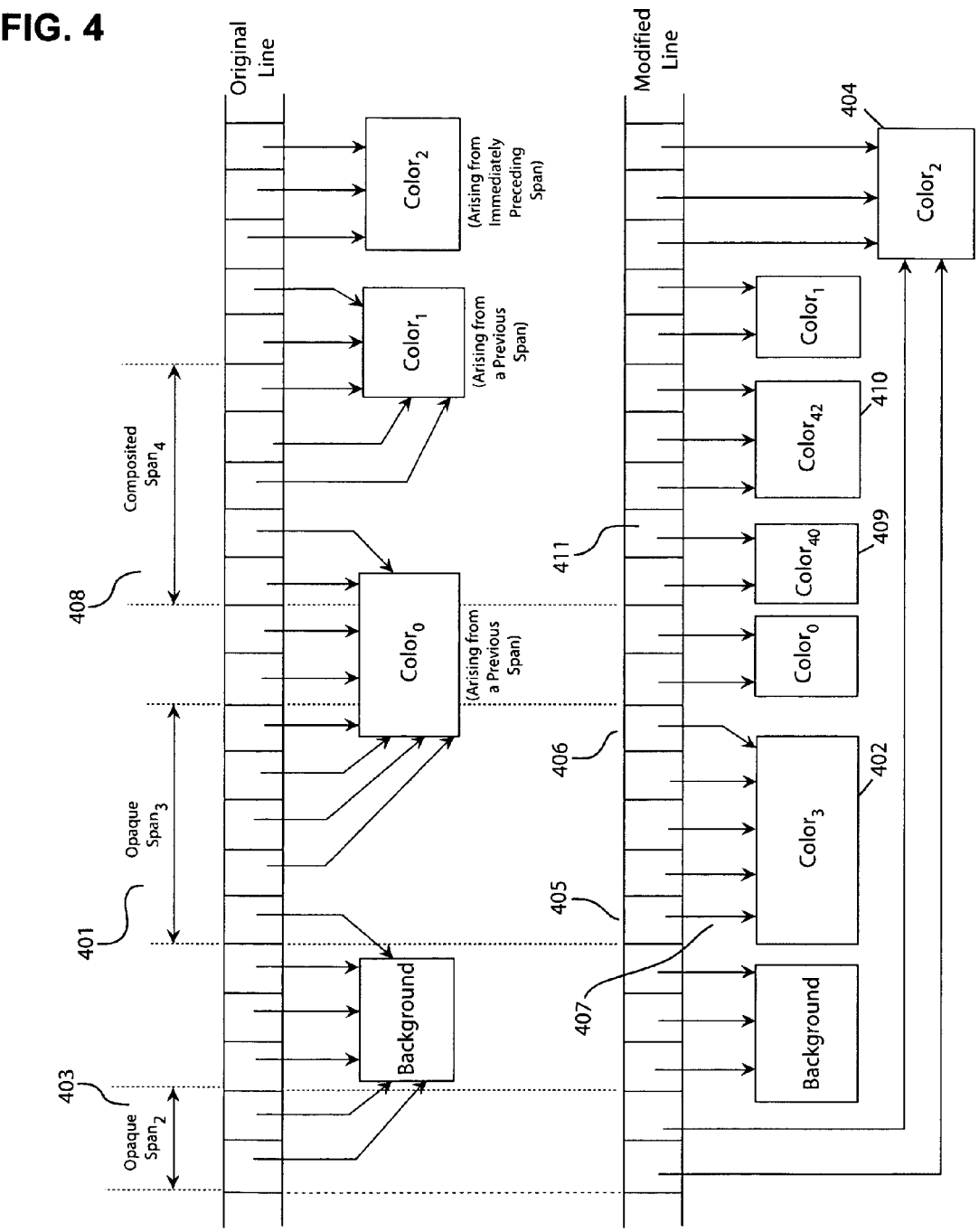
FIG. 4 is an illustration of a modification of the array and referenced colors of FIG. 3.

FIG. 4 is an illustration of a modification of the array and referenced colors of FIG. 3. The array and referenced colors are modified by the addition of a new opaque span and a new composite span. New spans are sequentially processed from simple or repeated span records. Whether a span is painted opaquely in accordance with the supplied properties of the span is first determined.

The color for an opaque span, such as 401, is allocated by way of memory 402. If it is easy to determine that the color of a new span, such as 403, is the same as a previously encountered color, a reference to a previously allocated memory, such as 404, is determined for that color instead. This principle is applied particularly when the allocated color is black or white, or when it is the same as the color of the most recently processed span. This holds true even for the case where the painted opaque span is not contiguous with the most recently processed span.

Next, while considering span 401, the start pixel element 405 and end pixel element (406) indicated by the current position and the length of the span 401 are identified. The pointers stored in the array elements between and including those pixels (i.e., 403, 404) are replaced with the pointer to the color of the span, such as 407.

For a span that is not opaquely painted, such as 408, which is utilizing other painting models, each pixel in the array between and including the start pixel and end pixel is sequentially examined. At the first pixel, and subsequently when any reference that was previously stored in the array changes from one pixel to the next, new memory 409, 410 is allocated for a color. The value of the new color is computed according to the painting model and stored in the memory. A reference to the memory is stored for each relevant pixel, such as 411.

Figure 5:
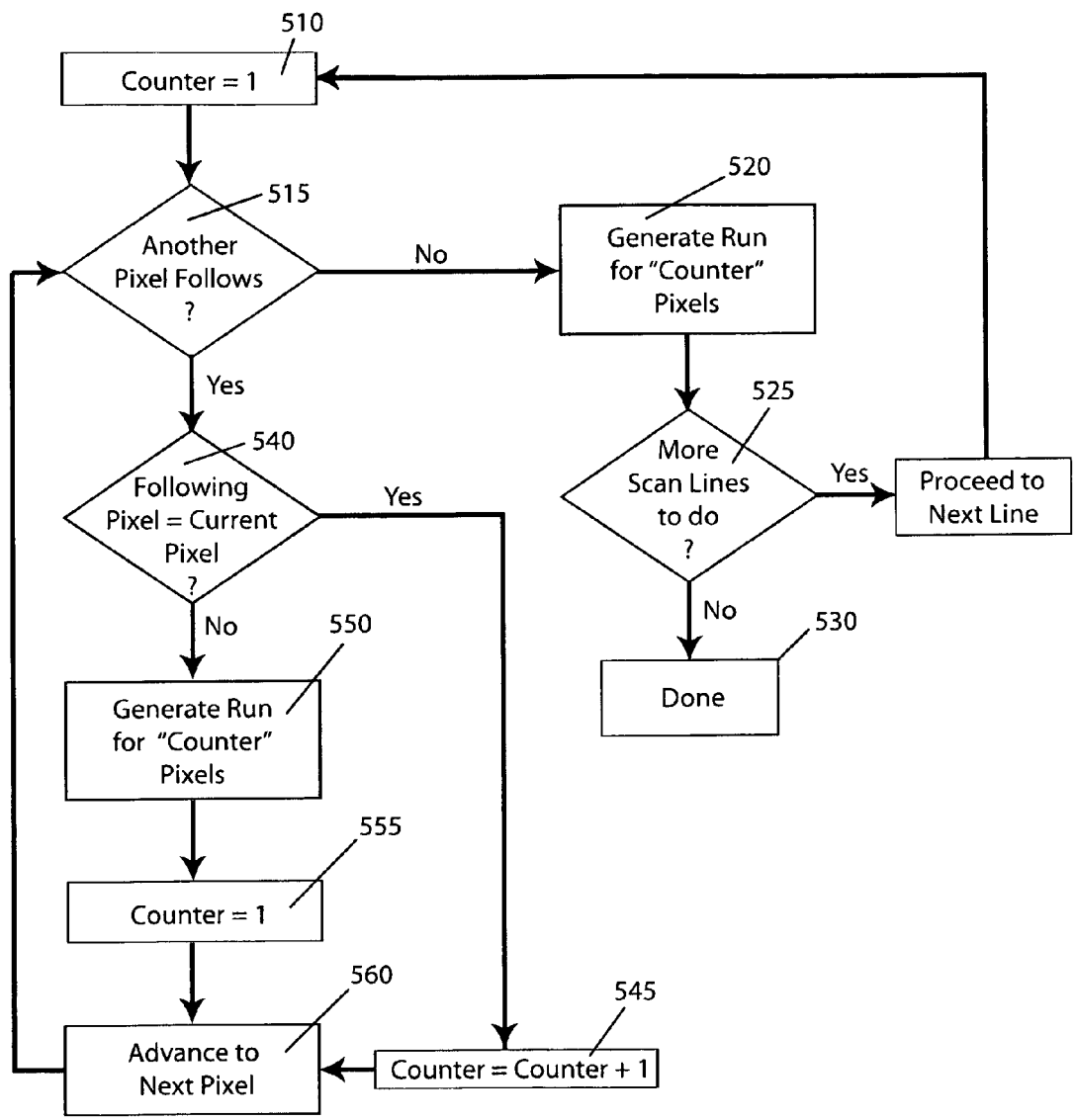
FIG. 5 is a flow chart illustrating the steps of the method of the invention in accordance with an exemplary embodiment.

FIG. 5 is a flow chart illustrating the steps of the method of the invention in accordance with an exemplary embodiment. Here, a comparison of pixels is performed to compute a desired run-length data. In accordance with the present embodiment, the method of the invention is implemented by initializing a counter to 1, as indicated in step 510. When all spans of a line have been consumed, sequential flattened runs are generated from the pixel array by comparing each element in the array with its successor, as indicated in step 515.

If there is no successor pixel with which to perform a comparison, then the end of the line has been reached, and a final span is generated according to the referenced color of the last pixel and the current value of the counter, as indicated in step 520. A check is then performed to determine whether more scan lines are available for processing, as indicated in step 525. If more scan lines are available, a return to step 510 occurs. If not, the method is terminated, as indicated in step 530. In this manner, records for the next scan line are processed in an iterative manner until the raster is complete.

If a comparison of each element in the array with its successor reveals that the pointers for successive pixels are the same (step 540), then the counter is incremented, as indicated in step 545. An advance to the next pixel is then performed, as indicated in step 560.

If the pointers for successive pixels are different, a run is generated according to the color referenced by the left pixel in the comparison and length indicated by the counter, as indicated in step 550. The counter is then reset to 1, as indicated in step 555. In contemplated embodiments, the generation of a run involves calling a function for the client of the flattening code to process, e.g., to draw the span or to store the span in a file.

Figure 6:
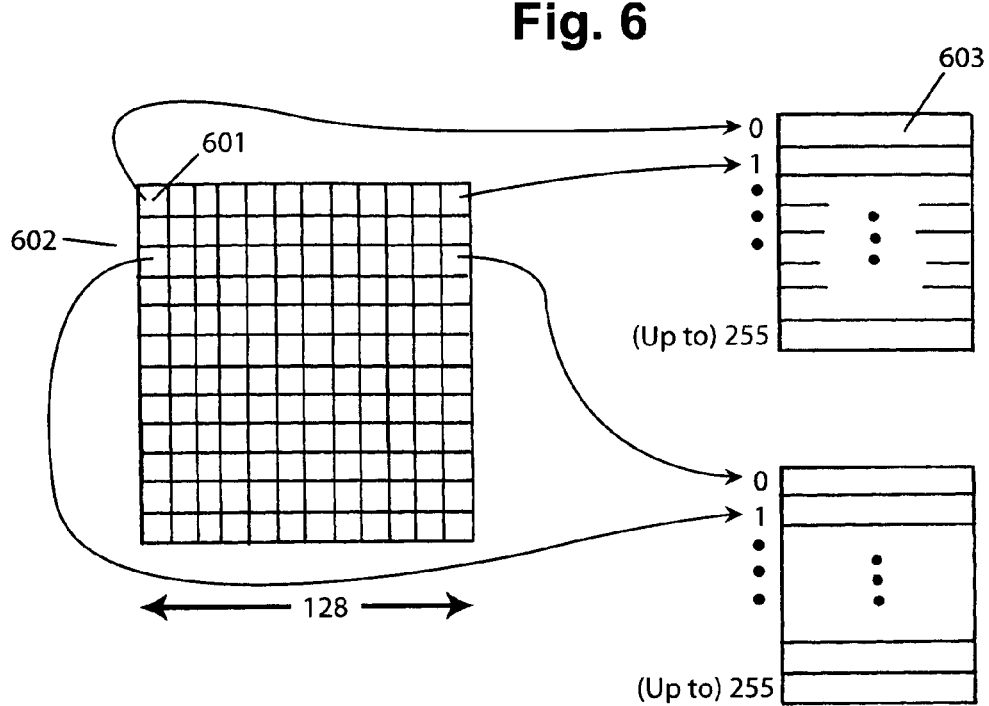
FIG. 6 is an illustration of the use of a block of 8-bit pixels to store indexes in color tables or palettes in accordance with an alternative exemplary embodiment of the invention.

FIG. 6 is an illustration of the use of a block of 8-bit pixels to store indexes in color tables or palettes in accordance with an alternative exemplary embodiment of the invention. Here, run-length data is determined for a rectangular block of pixels, instead of scan line by scan line. In preferred embodiments, a block of pixels is 128 pixels by 128 pixels, but is never more than 256 pixels wide.

As shown in FIG. 6, each pixel, such as 601 in a block 602, is represented by only 8 bits of memory. Here, the memory for successive pixels in one line of the block is stored contiguously.

Spans are received by way of function calls whose parameters provide all the information about the span, such as the length, the color, and the like. The set of colorants is set by way of a separate function call such that it becomes unnecessary to check whether the colorant set has changed from span to span. Where a run spans more than one block, the span is divided up and processed separately for each block.

A table (or 'palette') 603 of up to 256 distinct colors is allocated for at least every pair of scan lines in a block. There are only 256 pixels in the two scan lines. Hence, in accordance with preferred embodiments there are at most 256 distinct colors, and therefore 8-bits is enough for each pixel to store an index into the table that is associated with the line in which a pixel is found. Typically, the number of colors is often significantly less than 256 such that sharing of the table between more than two lines is possible. For any line that would raise the total colors to more than 256, however, a new table must be started.

Figure 7:
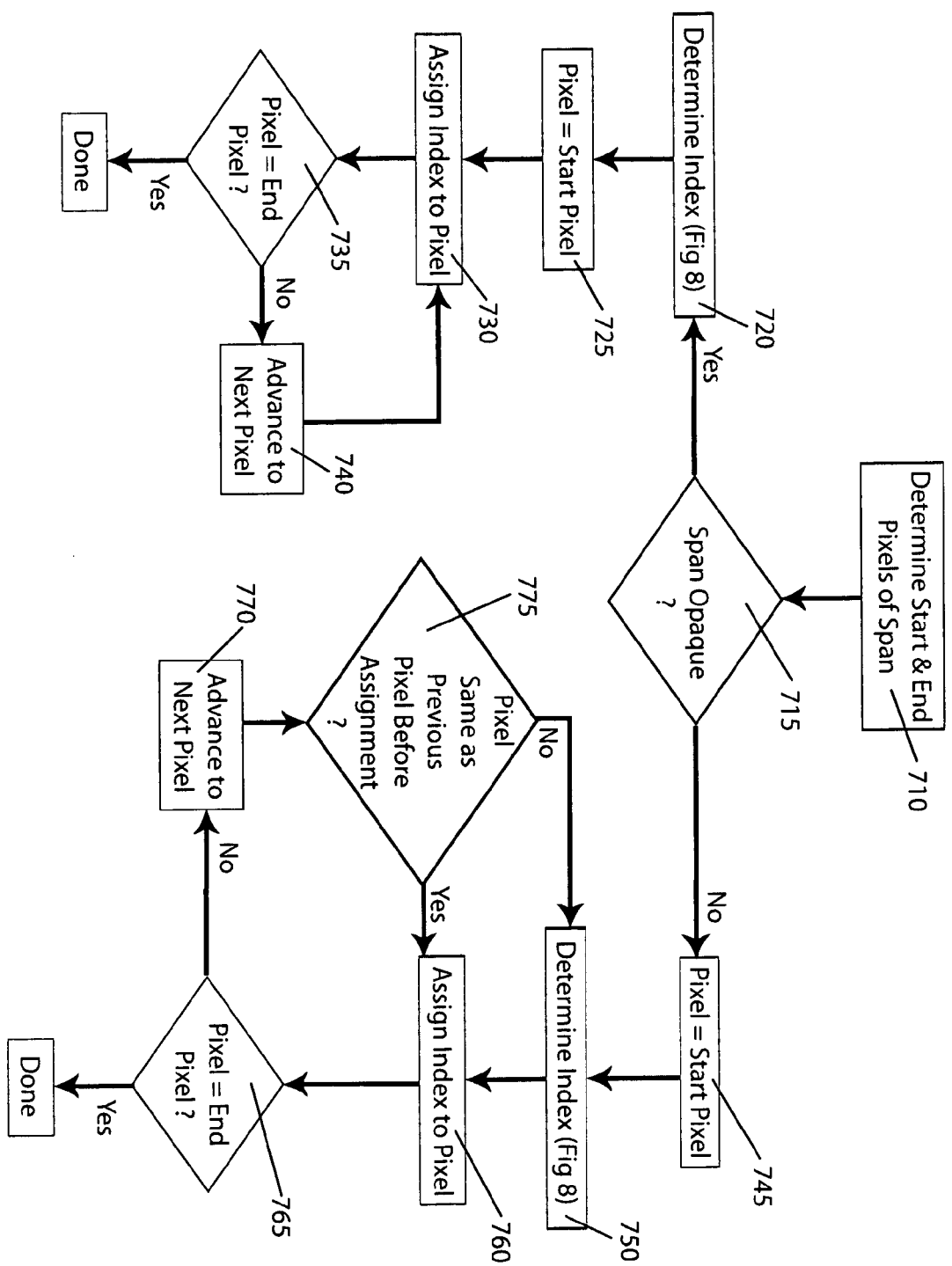
FIG. 7 is a flow chart illustrating the steps of the method of the invention in accordance with the alternative exemplary embodiment.

FIG. 7 is a flow chart illustrating the steps of the method of the invention in accordance with an alternative exemplary embodiment. In accordance with the present embodiment of the invention, the method is implemented by determining start and end pixels, as indicated in step 710.

Next, a check is performed to determine whether a span is opaque based on the supplied properties of the span, as indicated in step 715. If the span is opaque, then an index is determined, as indicated in step 720.

The index is then inserted into all the pixels between and including the start and end pixels of the span. Firstly, a check is made to determine whether the pixel is the first pixel in the span, as indicated in the step 725. The index is then assigned to the present pixel, as indicated in step 730. A check is then made to determine whether the present pixel is an end pixel of the span, as indicated in step 735. If the present pixel is an end pixel, then the method is terminated; otherwise, an advance to the next pixel occurs, as indicated in step 740. A return to step 730 then occurs.

For non-opaque spans, different indexes may be required to represent the combination of the color that is present in a pixel and the color of the new span. Here, each pixel between and including the start and end pixels of the span is examined to determine whether a pixel is the first pixel in the span, as indicated in 745 and subsequent steps. An index for each new color is determined, as indicated in 750.

The index is then assigned to the present pixel, as indicated in step 760. A check is then made to determine whether the present pixel is an end pixel, as indicated in step 765. If the present pixel is an end pixel, then the method is terminated. If the present pixel is not an end pixel, then an advance to the next pixel occurs, as indicated in step 770.

A comparison between the present pixel and a previous pixel prior to assignment of an index to the previous pixel is performed to determine whether the present pixel is the same as the previous pixel prior to the assignment of the index, as indicated in step 775. If the present pixel is the same as a previous pixel prior to assignment of the index to the previous pixel, then a return to step 760 occurs; otherwise a return to step 750 occurs.

Figure 8:
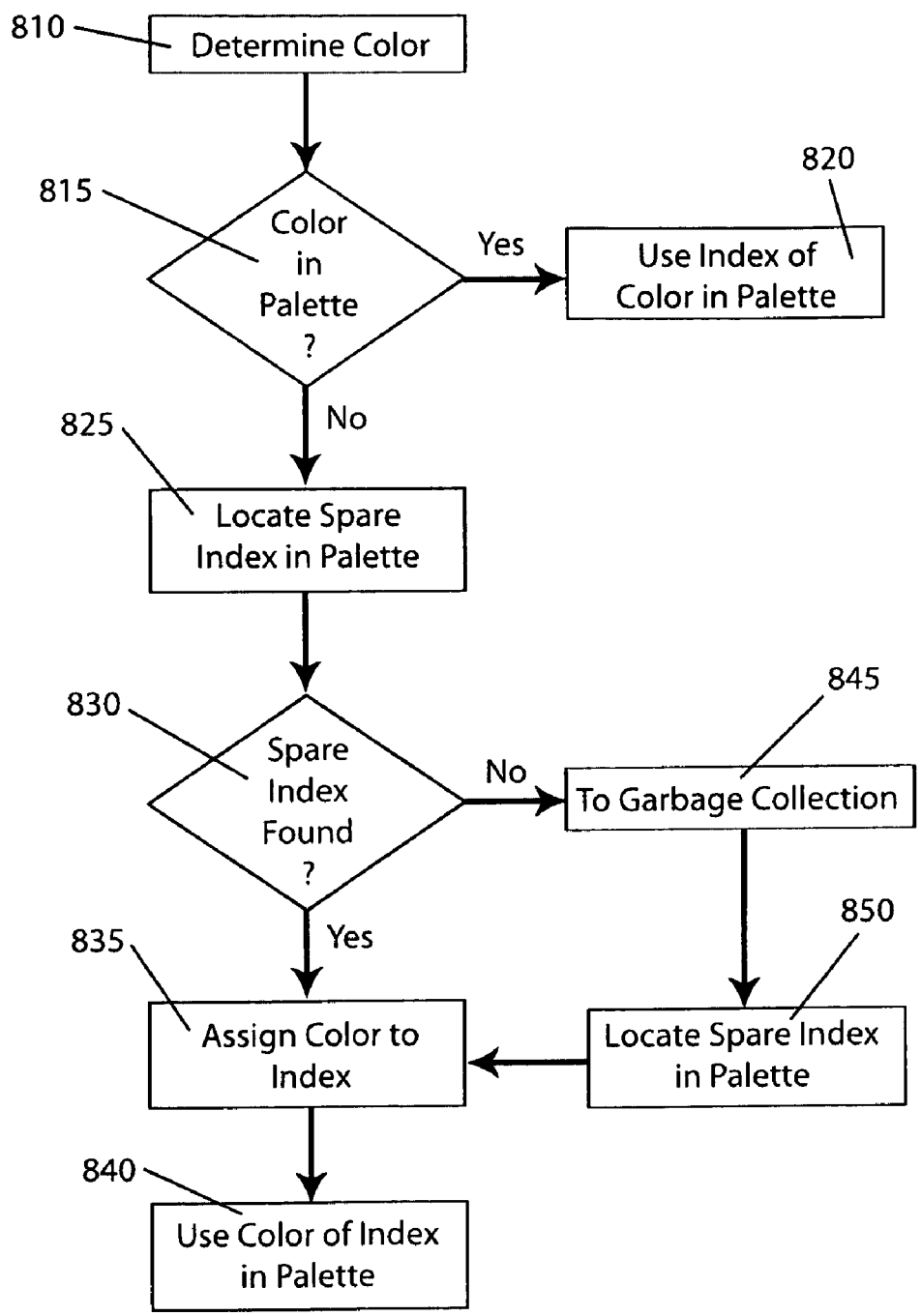
FIG. 8 is a flow chart illustrating the steps for determining an index for the method of FIG. 7.

FIG. 8 is a flow chart illustrating the steps for determining an index for the method of FIG. 7. Here, an index is located by first determining the required color, as indicated in step 810. For a span that is opaque, the color of the required color is the color of the span. In the case of overprinted spans or where a composite is required, the color is a combination of the color in the palette that is indicated by the existing index in a pixel and the color of the new span.

A check is then made to determine whether the color is already present in the palette, as indicated in step 815. If so, then the existing index of the color in the palette is used, as indicated in step 820. If the color is not already present in the palette, then an unused index is located, as indicated in step 825. If a spare (i.e., unused index) is found (step 830), then a new color is assigned to the entry in the palette (step 835) and used as the index, as indicated in step 840. In accordance with the present embodiment, unused indexes are those that are greater than the highest numbered index in use.

In certain rare situations, all 256 indexes may have been used, and thus a spare pixel is not available. This can only occur when at least one color is no longer visible, all pixels referencing it having since been replaced with another index. In this event, garbage collection and table compaction are performed in a manner known in the art, as indicated in step 845. At this point, a spare index within the palette is obtained, and a return to step 835 occurs, as indicated in step 850.

In a further embodiment of the invention, an additional optimization is implemented such that where a block contains only one color or where any line within the block consists of only one color, a respective single color is stored for the block or line. As a result, the allocation of pixel memory for the storage of indexes is not required. Where an opaque span obliterates a whole line of pixels, the line can be compacted by reverting to such a smaller representation. However, no attempt is made to compare colors to determine whether all of the pixels on a line are identical; this condition is rare, and thus the required extra processing is a waste of computing resources. In accordance with the embodiments of the invention, when all spans have been inserted into a block, flattening is complete and non-overlapping run length data is reconstructed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for generating run-length encoded raster data from spans, comprising:
adding a first encoded raster to spans of at least one scan-converted shape to produce a second encoded raster;
expanding runs of the first encoded raster into memory for at least one individual pixel within the first encoded raster to generate an expanded partial raster;
sequentially expanding each span of consecutive shapes located within a region of the at least one individual pixel within the first encoded raster into the expanded partial raster;
comparing colors of a referenced pixel within the expanded partial raster to colors of pixels successive to the referenced pixel to determine whether the colors are identical;
accumulating referenced pixels into a new span if the color of the pixels successive to the referenced pixels is identical to the color of pixels preceding the referenced pixels until all pixels of a line are processed.

2. The method of claim 1, wherein the first encoded raster comprises overlapping spans and the second encoded rasters comprises non-overlapping run-length encoded rasters.

3. The method of claim 1, wherein said expanding step comprises the steps of:
replacing earlier referenced colors of pixels in each span with subsequent colors if an overlaying span is opaque, and
individually combining pixel colors from the new span with colors of each background pixel if the overlaying span is not opaque.

4. The method of claim 1, wherein the span comprises a series of records.

5. The method of claim 4, wherein the records comprise at least one 32 bit word.

6. The method of claim 5, wherein a least significant bits of the 32 bit word are used to store a code for indicating a type of record.

7. The method of claim 6, wherein the type of record comprises a position, set colorants, simple span, repeated span, and header record types.

8. The method of claim 7, wherein said position indicates whether a number stored in a most significant 24 bits of the record should reset a current position state in a record of span data that represent an offset in pixels from a left side of a scan line where subsequent span data should start;
said set colorants indicate whether the subsequent span data should contain a number of colorants shown in the record, and whether the number of indexes stored in the record identifies the colorants;
said simple span indicates whether the span having a length that is established by an illustrated 16 bits of the record and having color values in as many 10 bit portions of a first and second successive 32 bit words as are necessary should be drawn from a point that commences from a current position in the span;
said repeated span packs multiple spans into one record upon an occurrence of many successive contiguous short spans, and for which a set of colorants does not change; and wherein
said repeated span indicates how much data is supplied for the scan line such that the record can determine when the scan line is complete.

9. The method of claim 1, further comprising the steps of:
comparing each referenced element in a pixel array with a successor pixel element in the pixel array;
incrementing a counter and advancing to a next pixel in the pixel array if a pointer of a first referenced element in the pixel array is identical to the pointer of the successor pixel;
generating a run based on the color referenced by a left pixel in said comparison step and a length indicated by the counter; and
resetting the counter if the pointer of the first referenced element in the pixel array is different than the pointer of the successor pixel.

10. The method of claim 1, further comprising the steps of:
   comparing each referenced element in a pixel array with a successor pixel element if a pointer of a first referenced element in the pixel array is identical to the pointer of the successor pixel; and
   incrementing a counter and advancing to a next pixel in the pixel array.

11. The method of claim 10, wherein said generation step comprises calling a function for a client of a flattening code to process.

12. The method of claim 11, wherein said calling a function for a client of a flattening code to process comprises drawing the span or storing the span in memory.

13. A method for generating run-length encoded raster data from spans, comprising:
   initializing a counter to a predetermined value;
   comparing pixels of a span in a line to other pixels in the span to compute desired run-length data;
   generating sequential flattened runs based on the run-length data;
   generating a final span based on a referenced color of a last pixel in the span and a current value of the counter subsequent to generating sequential flattened runs if a successive pixel for performing a comparison is not found;
   performing a check to determine whether more scan lines are available for processing; and
   incrementing the counter and returning to the step of comparing pixels if more scan lanes are available.

14. The method of claim 13, wherein said run-length data comprises a series of records.

15. The method of claim 14, wherein a record comprises at least one 32 bit word.

16. The method of claim 15, wherein a least significant bits of the 32 bit word are used to store a code for indicating a type of record.

17. The method of claim 16, wherein the type of record comprises a position, set colorants, simple span, repeated span, and header record types.

18. The method of claim 16, wherein said position indicates whether a number stored in a most significant 24 bits of the record should reset a current position state in a record of the run-length data that represent an offset in pixels from a left side of a scan line where subsequent span data should start;
   said set colorants indicate whether the subsequent span data should contain a number of colorants shown in the record, and whether the number of indexes stored in the record identifies the colorants;
   said simple span indicates whether the span having a length that is established by an illustrated 16 bits of the record and having color values in as many 10 bit portions of a first and second successive 32 bit words as are necessary should be drawn from a point that commences from a current position in the span;
   said repeated span packs multiple spans into one record upon an occurrence of many successive contiguous short spans occur, and for which a set of colorants does not change; and wherein
   said repeated span indicates how much date is supplied for the scan line such that the record can determine when the scan line is complete.

19. The method of claim 9, further comprising the steps of:
   replacing earlier referenced colors of pixels in the run-length data with subsequent colors if an overlaying span is opaque, and
   individually combining pixel colors from the new span with colors of each background pixel if the overlaying span is not opaque.

20. The method of claim 13, further comprising the steps of:
   comparing each referenced element in a pixel array with a successor pixel element;
   incrementing a counter and advancing to a next pixel in the pixel array if a pointer of a first referenced element in the pixel array is identical to the pointer of the successor pixel;
   generating a run based on the color referenced by a left pixel in said comparison step and length indicated by the counter and resetting the counter if the pointer of the first referenced element in the pixel array is different than the pointer of the successor pixel.

21. The method of claim 13, further comprising the steps of:
   comparing each referenced element in the pixel array with a successor pixel element if a pointer of a first referenced element in the pixel array is identical to a pointer of the successor pixel element; and
   incrementing the counter and advancing to a next pixel in the pixel array.

22. The method of claim 13, wherein said step of generating sequential flattened runs comprises calling a function for a client of a flattening code to process.

23. The method of claim 22, wherein said calling a function for a client of a flattening code to process comprises drawing the span or storing the span in memory.

24. A method for generating run-length encoded raster data from spans, comprising:
   determining start pixels and end pixels in a span;
   determining whether the span is opaque based on supplied properties of the span;
   assigning an index to a referenced pixel of the span;
   determining whether the referenced pixel is an end pixel; and
   inserting the index into the start and end pixels and all pixels between said start and end pixels if the referenced pixel is an end pixel.

25. The method of claim 24, further comprising the steps of:
   determining a required color for a palette;
   determining whether the required color is currently present in the palette;
   using an existing color of the palette if the required color is currently present in the palette, otherwise assigning a new color to an entry in the palette.

26. The method of claim 24, further comprising the steps of:
   determining the index;
   checking to determine whether the pixel is the first pixel in the span;
   assigning the index to the referenced pixel;
   determining whether the referenced pixel is the end pixel of the span; and
   advancing to a next pixel and returning to said assigning step if the referenced pixel if not an end pixel.

27. The method of 24, further comprising the steps of:
examining the start pixel, the end pixel, and all pixels between the start and end pixels to determine whether each pixel is the first pixel in the span;
determining the index for each new color;
assigning the index to the referenced pixel;
determining whether the referenced pixel is the end pixel of the span; and
advancing to a next pixel if the referenced pixel if not an end pixel.

28. The method of claim 24, further comprising the steps of:
comparing the referenced pixel and a previous pixel prior to assignment of the index to the previous index to determine whether the referenced pixel is identical to the previous pixel prior to assignment of the index;
returning to said step of determining the index for each new color if the referenced pixel is identical to the previous pixel prior to assignment of the index, otherwise returning to said step of assigning the index to the referenced pixel.

29. The method of claim 26, wherein said step of determining an index comprising the steps of:
determining a required color for a palette;
determining whether the required color is currently present in the palette; and
using an existing color of the palette if the required color is currently present in the palette, otherwise assigning a new color to an entry in the palette.

* * * * *

UNITED STATES PATENT AND TRADEMARK OFFICE
CERTIFICATE OF CORRECTION

| | |
|---|---|
| PATENT NO. | : 6,996,284 B2 |
| APPLICATION NO. | : 10/378543 |
| DATED | : February 7, 2006 |
| INVENTOR(S) | : David John Earl et al. |

Page 1 of 1

It is certified that error appears in the above-identified patent and that said Letters Patent is hereby corrected as shown below:

Column 9, Line 47, Delete "run length" and insert -- run-length--.

Column 11, Line 32, In Claim 13, delete "lanes" and insert -- lines --.

Column 13, Line 1, In Claim 27, delete "24," and insert -- claim 24,--.

Signed and Sealed this

Twenty-fifth Day of July, 2006

JON W. DUDAS
*Director of the United States Patent and Trademark Office*